Figure 1:
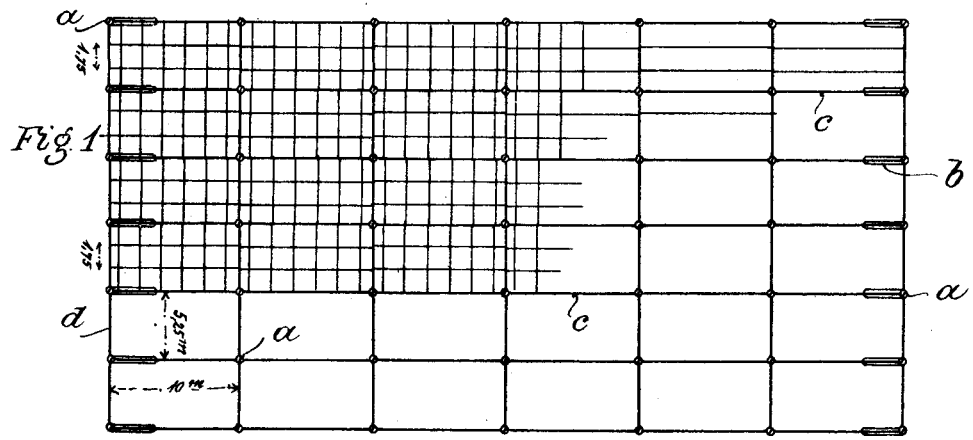

No. 675,850. Patented June 4, 1901.
A. BRUNNEDER.
FRAME FOR VINES.
(Application filed Mar. 30, 1901.)
(No Model.)

Witnesses:
Anton A. Gleixner,
F. H. Schott

Inventor:
August Brunneder,
by Max Imay
Attorney.

UNITED STATES PATENT OFFICE.

AUGUST BRUNNEDER, OF HAIMHAUSEN, NEAR MUNICH, GERMANY.

FRAME FOR VINES.

SPECIFICATION forming part of Letters Patent No. 675,850, dated June 4, 1901.

Application filed March 30, 1901. Serial No. 53,653. (No model.)

*To all whom it may concern:*

Be it known that I, AUGUST BRUNNEDER, a citizen of the Empire of Germany, residing at Haimhausen, near Munich, Germany, have invented certain new and useful Improvements in Frames for Vines; and I do hereby declare the following to be a full, clear, and exact description of the invention, such as will enable others skilled in the art to which it appertains to make and use the same.

This invention relates to frames for supporting growing vines, such as hop-vines, grape-vines, and the like.

One of the greatest drawbacks of the present form of frames is that there is such a disproportionate amount or number of the upright supports (generally made of wood) required, and also diagonal wooden stays. These wooden supports generally have a number of crevices or cracks, that form a breeding-bed for various kinds of insects which not only tend to destroy the strength and durability of the various wooden supports but also feed upon the vines supported by the frame, to the very great injury of the vines. Furthermore, these wooden supports make the frames a very expensive item in the cultivation of hop-vines and the like, as they must be renewed at frequent intervals on account of the said deleterious action of the various insects and also on account of very rapid deterioration resulting from the action of moisture and storms. If the wooden supports are at all weakened from either of the said causes, frequently whole divisions of the frames through the plantation are blown down during severe storms. As the wooden supports, even of the best quality, rot away, at the longest, within eight or nine years and a hop plantation exists for from twenty to twenty-five years, it is evident that the woodwork of the frame must be renewed at least three times during the said period, and the removal of these posts and the substitution of new ones in their place often breaks a number of the wires constituting the frame and has a more or less destructive action on the vines.

One object of the present invention is to provide, with a transverse framework of wires or rods, means for supporting the same at various points around its periphery, and also at intermediate points, in such a manner that the strain on the supports will be principally longitudinal instead of transverse, as heretofore.

A further object of my invention is to provide means for securing the supports to the framework in such a manner that they can readily be removed and replaced without disarranging the framework or disturbing the vines in proximity thereto.

My invention, broadly stated, consists in combining with a transverse framework of wires or rods a number of upright supports and means for securing the framework to the supports at an intermediate part of the latter, and also means for securing the framework at various points in proximity to each support of the top of the latter, and also means for connecting the upper portion of the supports with the ground.

Figure 2:
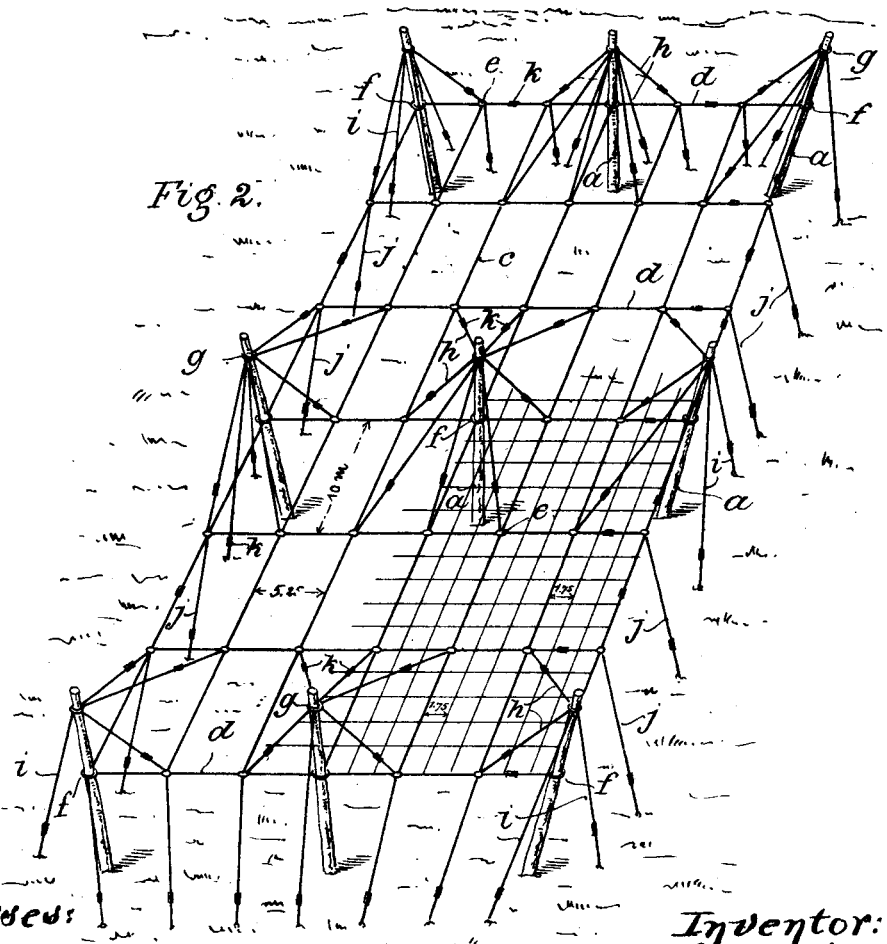

In the accompanying drawings, representing an apparatus embodying my invention in preferred form of construction and arrangement, Figure 1 represents the framework of wires or rods in plan. Fig. 2 is a perspective view of one form of my invention.

Referring to the figures of the drawings, *a* represents the upright supports, generally made of wood. The framework is composed of seven longitudinal and an equal number of transverse wires, which are preferably arranged at right angles. The forty-nine rectangles thus formed are preferably about ten meters in length by five and one-quarter meters wide; but of course these dimensions can be increased or diminished without departing from the scope of my invention, and the shape of the sections and, in fact, of the whole arrangement may be other than rectangular. At the four corners of the rectangle are large rings *f*, to which are fastened the extremities of the wires meeting at that point. Similar rings are also fastened at intermediate points along the outer wire of the frame and also at one or more intermediate places, in each instance being located at the intersections of the individual wires of the frame. At each intersection of the wires *c* and *d*, except at the places just mentioned, where the rings *f* are inserted, the sections of wires are connected to small rings *e*.

The several upright supports *a* are inserted in the various rings *f* and planted in the ground for a short distance. A number of rings $g$ are placed on the tops of these supports $a$ and secured thereto. From each of these rings $g$ tie-wires $h$ extend radially to the various rings $e$ at the intersections that lie in rectangles bordering on the said ring $f$, through which the support passes. These tie-wires $h$ may have turnbuckles $k$ for the purpose of preserving the proper tension upon the same.

The upright supports in the rings along the outer wires of the frame have tie-wires $i$ extending from the upper rings $g$ to the ground in proximity to the base of the supports to preserve the same against transverse strain. A number of tie-wires $j$ also extend from each of the rings $e$ along the outer wires of the frames to the ground for the same purpose as the said wires $i$.

The wooden supports are preferably impregnated with any of the well-known preserving compounds, and the metal work being galvanized a structure of the kind above described would be likely to endure for the usual period covered by one set of hop-vines; but if it is required to renew any of the upright supports they are readily removed from the rings $g$ and $f$ and new ones substituted without breaking any of the wires or supporting-rods or at all injuring the vines.

Having thus fully described my invention, what I claim as new, and desire to secure by Letters Patent, is—

1. The combination with upright supports, of a transverse framework secured to said supports below their tops, the framework being supported at points in proximity to the supports from the upper portions thereof.

2. The combination with upright supports, of a transverse framework secured to said supports below their tops, and rods radiating from the upper part of said supports to the framework at places in proximity to said supports.

3. The combination with upright supports, of a transverse framework secured to said supports below their tops, rings secured to the upper part of said supports, and rods connecting the said rings with the framework at places in proximity to said supports.

4. The combination of a transverse framework having a plurality of rings forming a part thereof, a plurality of upright supports, said rings engaging said supports below their tops, and means supporting said framework at places in proximity to the supports from the upper portions of the latter.

5. The combination of a transverse framework having a plurality of rings forming a part thereof, a plurality of upright supports, said rings engaging said supports below their tops, a ring secured to the upper part of each of said supports, and rods connecting said latter rings with said framework at places in proximity to said supports.

6. The combination with upright supports, of a transverse framework secured to said supports below their tops, means supporting the framework at places in proximity to the supports from the upper portions of the supports, and rods extending from the upper part of said supports to the ground at places in proximity to the base of the supports.

7. The combination with upright supports, of a transverse framework secured to said supports below their tops, a ring secured to each of the upper parts of said supports, rods connecting said rings with the framework at places in proximity to said supports, and rods extending from said rings to the ground at places in proximity to the base of the supports.

8. The combination with upright supports, of a transverse framework secured to said supports below their tops, means supporting the framework in proximity to the supports from the upper portion of the supports, rods extending from the upper part of said supports to the ground at places in proximity to the base of the supports, and rods extending from the outside wires of the framework to the ground, said latter rods making an angle with the plane of the framework slightly greater than the right angle.

9. The combination of a framework comprising a plurality of longitudinal and transverse wires that have rings at their intersecting points, a plurality of upright supports passing through a number of said rings, a ring secured to the upper part of each of said upright supports, and rods connecting said latter rings with the rings at said intersections in proximity to the supports.

10. The combination of a framework comprising a plurality of longitudinal and transverse wires that have rings at their intersecting points, a plurality of upright supports passing through a number of said rings, a ring secured to the upper part of each of said upright supports, rods connecting said latter rings with the rings at said intersections in proximity to the supports, and wires extending from said upper rings to the ground.

11. The combination of a framework comprising a plurality of longitudinal and transverse wires that have rings at their intersecting points, a plurality of upright supports passing through a number of said rings, a ring secured to the upper part of each of said upright supports, rods connecting said latter rings with the rings at said intersections in proximity to the supports, wires extending from said upper rings to the ground, and wires extending from the said rings at said intersections along the outside of said frame to the ground.

In testimony whereof I affix my signature in presence of two witnesses.

AUGUST BRUNNEDER.

Witnesses:
SIGMUND FALK,
RUDOLPH W. HICOE.